United States Patent
Wu et al.

(10) Patent No.: US 11,762,465 B2
(45) Date of Patent: Sep. 19, 2023

(54) WIRELESS POSITION TRACKING DEVICE, DISPLAY SYSTEM AND WEARABLE DEVICE

(71) Applicant: HTC Corporation, Taoyuan (TW)

(72) Inventors: Jung Lung Wu, Taoyuan (TW); Hsien Ju Hsieh, Taoyuan (TW); Wei Te Tu, Taoyuan (TW); Chih Chien Chen, Taoyuan (TW); Fang Yu Cheng, Taoyuan (TW); Li-Hsun Chang, Taoyuan (TW); Yu-Hsun Chung, Taoyuan (TW)

(73) Assignee: HTC Corporation, Taoyuan (TW)

( * ) Notice: Subject to any disclaimer, the term of this patent is extended or adjusted under 35 U.S.C. 154(b) by 84 days.

(21) Appl. No.: 17/561,718

(22) Filed: Dec. 24, 2021

(65) Prior Publication Data

US 2023/0025118 A1    Jan. 26, 2023

Related U.S. Application Data

(60) Provisional application No. 63/224,878, filed on Jul. 23, 2021.

(51) Int. Cl.
*G06F 3/01*     (2006.01)
*G06F 3/03*     (2006.01)
(Continued)

(52) U.S. Cl.
CPC ............ *G06F 3/014* (2013.01); *G02B 27/0101* (2013.01); *G06F 3/0308* (2013.01);
(Continued)

(58) Field of Classification Search
CPC ......... G06F 3/014; G06F 3/017; G06F 3/0308; G06F 3/0346; G06T 7/246; G02B 27/0101; G02B 27/017;
(Continued)

(56) References Cited

U.S. PATENT DOCUMENTS 6,328,706 B1 * 12/2001 Yattavong .......... A61F 5/05866
128/878
9,649,558 B2    5/2017 Stafford et al.
(Continued)

FOREIGN PATENT DOCUMENTS

CN    106232192    12/2019
TW    M565994 U    9/2018
(Continued)

OTHER PUBLICATIONS

"Office Action of Taiwan Counterpart Application", issued on Oct. 4, 2022, p1-p15.

*Primary Examiner* — Tom V Sheng
(74) *Attorney, Agent, or Firm* — JCIPRNET

(57) ABSTRACT

A wireless position tracking device, a display system, and a wearable device are provided. The wireless position tracking device includes a rigid body, point light sources, a motion sensor, and a wireless transmission module. The rigid body has an inner concave surface, a head, a connecting portion, and a tail. The connecting portion connects the head and tail. The point light sources are fixed to positions outside the inner concave surface. The motion sensor locates in the rigid body for sensing a motion thereof and generating motion information. The wireless transmission module locates in the rigid body and electrically connects the motion sensor for wirelessly transmitting the motion information to the head-mounted device. An image capturing module of the head-mounted device captures a pattern formed by the point light sources. The head-mounted device calculates a relative position of the wireless position tracking device according to the pattern and motion information.

19 Claims, 8 Drawing Sheets

(51) Int. Cl.
*G06T 7/246* (2017.01)
*G02B 27/01* (2006.01)
*G06T 19/00* (2011.01)
*G06F 3/0346* (2013.01)
*G02B 27/00* (2006.01)

(52) U.S. Cl.
CPC .............. *G06T 7/246* (2017.01); *G06T 19/006* (2013.01); *G02B 27/0093* (2013.01); *G02B 27/017* (2013.01); *G02B 2027/0138* (2013.01); *G02B 2027/014* (2013.01); *G02B 2027/0178* (2013.01); *G02B 2027/0187* (2013.01); *G06F 3/017* (2013.01); *G06F 3/0346* (2013.01); *G06T 2207/10048* (2013.01)

(58) Field of Classification Search
CPC .............. G02B 27/0093; G06T 19/006; G02B 2027/0138; G02B 2027/014; G02B 2027/0178; G02B 2027/0187; G06T 2207/10048
USPC .......................................................... 345/156
See application file for complete search history.

(56) References Cited

U.S. PATENT DOCUMENTS

| | | | |
|---|---|---|---|
| 9,996,166 B2* | 6/2018 | Stafford et al. | G06F 3/017 |
| 11,175,734 B1* | 11/2021 | Hossain et al. | G06F 3/014 |
| 2015/0227198 A1* | 8/2015 | Fang et al. | G06F 3/014 |
| | | | 345/158 |
| 2016/0239096 A1* | 8/2016 | Okuno et al. | H04N 21/42222 |
| 2017/0027459 A1* | 2/2017 | Shimuta | A61B 5/681 |
| 2018/0330521 A1* | 11/2018 | Samples et al. | G01J 1/44 |
| 2019/0138094 A1* | 5/2019 | Miettinen et al. | G02B 27/0093 |
| 2019/0294261 A1* | 9/2019 | Lohse et al. | G02B 27/017 |

FOREIGN PATENT DOCUMENTS

| | | |
|---|---|---|
| TW | I642903 B | 12/2018 |
| TW | I662910 B | 6/2019 |
| TW | I687720 B | 3/2020 |

* cited by examiner

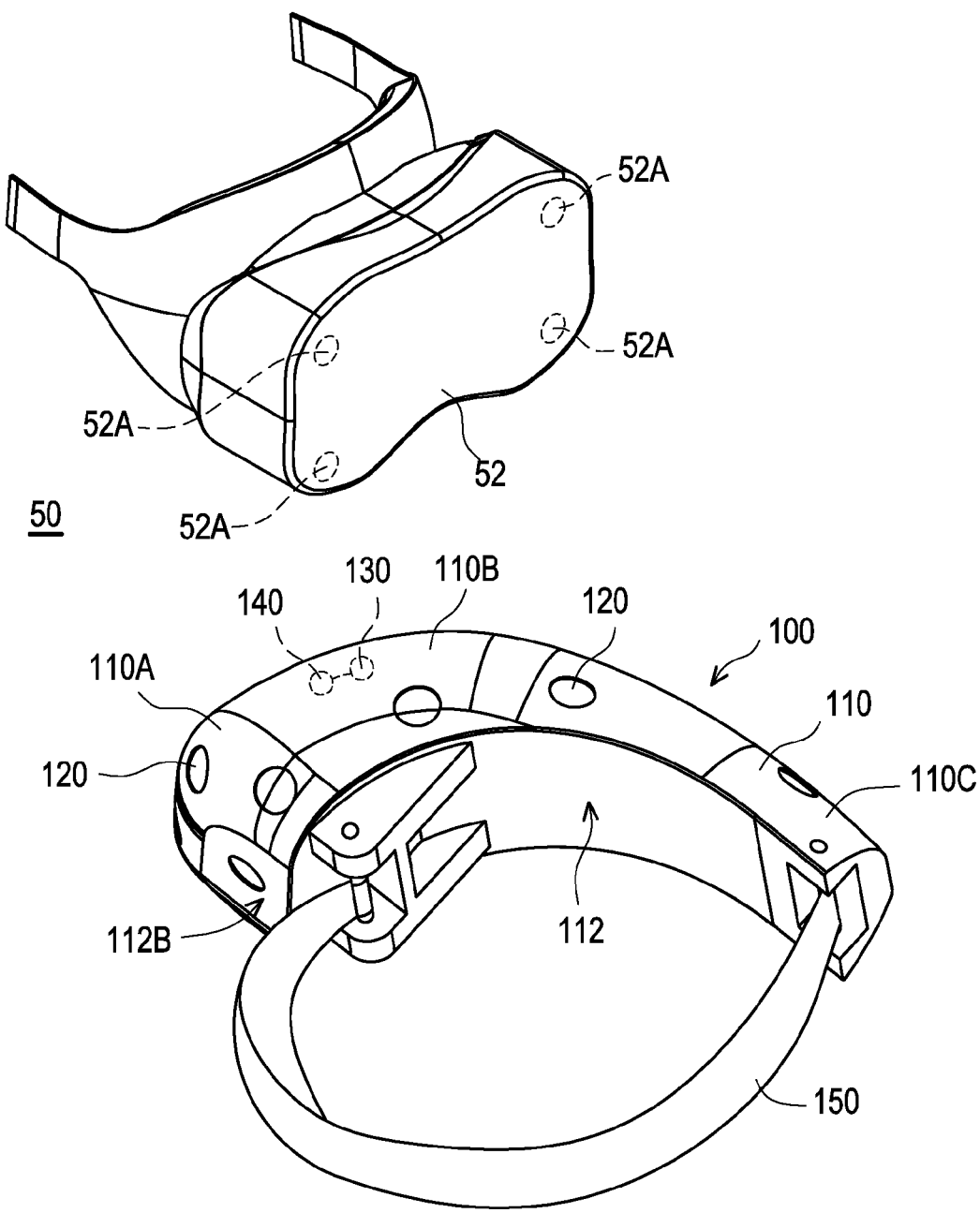
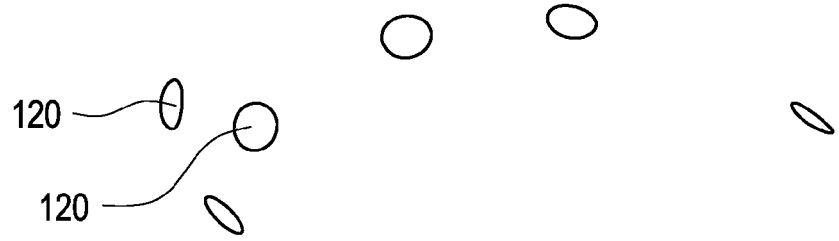
FIG. 1
FIG. 2

WIRELESS POSITION TRACKING DEVICE, DISPLAY SYSTEM AND WEARABLE DEVICE

CROSS-REFERENCE TO RELATED APPLICATION

This application claims the priority benefit of U.S. Provisional Application Aerial No. 63/224,878, filed on Jul. 23, 2021. The entirety of the above-mentioned patent application is hereby incorporated by reference herein and made a part of this specification.

BACKGROUND

Technical Field

The invention relates to a position tracking device, a system, and a device, and in particular, relates to a wireless position tracking device, a display system, and a wearable device.

Description of Related Art

The popularity of virtual reality (VR) technology is increasing day by day. During the operation of the virtual reality device, if other objects or other limbs need to be controlled or tracked in a hands-free state, the controller is required be fastened to the objects or the limbs. However, the volume and weight of the controller may prevent the user from flexibly and conveniently operating the controller. Further, since the controller needs be fastened onto the object or limb, how to apply the controller to objects of various sizes and limbs of users of different body types is also a problem to be overcome.

SUMMARY

The invention provides a wireless position tracking device, a display system, and a wearable device capable of improving poor flexibility and providing wide applicability.

The invention provides a wireless position tracking device configured for wirelessly communicating with a head-mounted device. The wireless position tracking device includes a rigid body, a plurality of point light sources, a motion sensor, and a wireless transmission module. The rigid body has an inner concave surface and includes a head, a connecting portion, and a tail. The connecting portion is connected to the head and the tail. The point light sources are fixed to a plurality of positions outside the inner concave surface of the rigid body. The motion sensor is disposed in the rigid body and is configured for sensing a motion of the rigid body and generating motion information. The wireless transmission module is disposed in the rigid body, is electrically connected to the motion sensor, and is configured for wirelessly transmitting the motion information to the head-mounted device. The head-mounted device includes at least one image capturing module. The image capturing module is used for capturing a pattern formed by the point light sources. The head-mounted device calculates a position of the wireless position tracking device relative to the head-mounted device according to the pattern and the motion information.

The invention further provides a display system including a head-mounted device and the wireless position tracking device.

The invention further provides a wearable device suitable for being fixed to a wrist of a user. The wearable device includes a rigid body and a coupling member. The rigid body has an inner concave surface and includes a head, a connecting portion, and a tail. The connecting portion is connected to the head and the tail. The inner concave surface at the tail is suitable for abutting against a back surface of the wrist, and the inner concave surface located at the head is suitable for abutting against an inner side surface of the wrist. The coupling member is assembled to the rigid body and is configured for fixing the rigid body onto the wrist.

To sum up, in the wireless position tracking device and the display system provided by the invention, since the head-mounted device may determine the posture of the wireless position tracking device, flexible and convenient operation as well as wide applicability are provided. In addition, the wearable device providing an ergonomic geometric design also may be widely applied.

BRIEF DESCRIPTION OF THE DRAWINGS

FIG. 1 is a schematic view of a display system according to an embodiment of the invention.

FIG. 2 is a schematic view of remained point light sources which are only visible from this viewing angle in a wireless position tracking device of FIG. 1.

DESCRIPTION OF THE EMBODIMENTS

Figure 3:
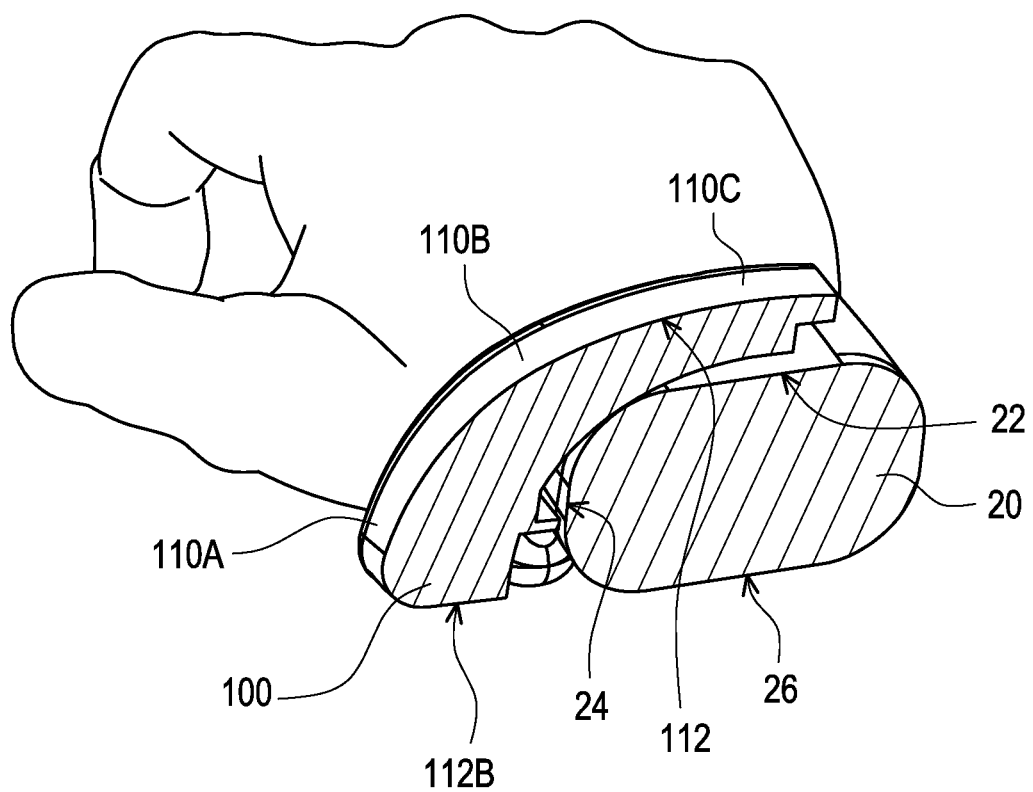
FIG. 3 is a schematic cross-sectional view of the wireless position tracking device of FIG. 1 being fixed to a wrist of a user.

FIG. 1 is a schematic view of a display system according to an embodiment of the invention. With reference to FIG. 1, a display system 50 provided by this embodiment includes a head-mounted device 52 and a wireless position tracking device 100. The display system 50 is applied to, for example, a virtual reality system, augmented reality, a mixed reality system, or other systems. The wireless position tracking device 100 is configured for wirelessly communicating with the head-mounted device 52. The head-mounted device 52 is suitable for being worn on a head of a user and may provide a display image for the user to watch or allow the user to see a computer image superimposed on an external real environment.

The wireless position tracking device 100 provided by this embodiment includes a rigid body 110, a plurality of point light sources 120, a motion sensor 130, and a wireless transmission module 140. The point light sources 120 are fixed to a plurality of positions on the rigid body 110. The rigid body 110 is mainly formed by a material that hardly deforms elastically or plastically. Therefore, relative positions among the point light sources 120 fixed on the rigid body 110 may remain unchanged.

The motion sensor 130 is disposed in the rigid body 110 and is configured for sensing a motion of the rigid body 110 and generating motion information. The motion sensor 130 may be an inertial measurement unit (6-DOF IMU). For instance, the motion sensor 130 may be a six degrees of freedom inertial measurement unit (6-DOF IMU) or a nine degrees of freedom inertial measurement unit (9-DOF IMU), and the six degrees of freedom inertial measurement unit may output linear acceleration values of X, Y, and Z axes and angular velocity values of X, Y, and Z axes. The nine degrees of freedom inertial measurement unit may output the linear acceleration values of X, Y, and Z axes, the angular velocity values of X, Y, and Z axes, and magnetic force values of X, Y, and Z axes. To be more specific, the six degrees of freedom inertial measurement unit includes a three-axis accelerometer and a three-axis gyroscope. The nine degrees of freedom inertial measurement unit includes a three-axis accelerometer, a three-axis gyroscope, and a three-axis magnetometer. The wireless transmission module 140 is disposed in the rigid body 110, is electrically connected to the motion sensor 130, and is configured for wirelessly transmitting the motion information to the head-mounted device 52.

FIG. 2 is a schematic view of remained point light sources which are only visible from this viewing angle in a wireless position tracking device of FIG. 1. With reference to FIG. 1 and FIG. 2, the head-mounted device 52 includes at least one image capturing module 52A. A plurality of image capturing modules 52A are used as an example in this embodiment, but the invention is not limited thereto. The image capturing modules 52 are used for capturing a pattern formed by the point light sources 120. In FIG. 2, the pattern formed by the point light sources 120 may be clearly seen. In this embodiment, the rigid body 110 is made of an opaque material, so the image capturing modules 52A may only capture a pattern formed by the point light sources 120 that is not shielded by the rigid body 110. In other words, the point light sources 120 are located on a surface of the rigid body 110. In other embodiments, the rigid body 110 has a transparent casing, and the point light sources 120 are located under the transparent casing, so that the image capturing modules 52A may capture the pattern formed by the point light sources 120 located under the transparent casing. In this embodiment, the point light sources 120 may be light emitting diodes, organic light emitting diodes, or other point light sources. The point light sources 120 may be used to emit visible light or invisible light, where the invisible light may be infrared light, as long as the image capturing modules 52 may capture the light emitted by the point light sources 120. Besides, although the point light sources 120 are used as an example in this embodiment, strip light sources or any other light sources of any shape may also be used in other embodiments, as long as the image capturing modules 52A can capture and determine a change of the pattern formed by the light sources. The image capturing modules 52A may be lenses of visible light or invisible light, where the invisible light may be infrared light.

According to the pattern captured by the image capturing modules 52A and the motion information provided by the wireless position tracking device 100, the head-mounted device 52 may calculate a position of the wireless position tracking device 100 relative to the head-mounted device 52. The "position" mentioned herein may cover a variety of information, and description is provided through the following examples, but the invention is not limited thereto.

The relative positions of the point light sources 120 on the rigid body 110 are fixed, and the relative positions of the point light sources 120 may be obtained in advance. Therefore, as long as the captured pattern formed by the point light sources 120 is compared with the stored relative positions of the point light sources 120 in the head-mounted device 52, a posture of the wireless position tracking device 100 relative to the head-mounted device 52 may be determined. In this way, an image seen by the user in the head-mounted device 52 may be accordingly changed or other feedbacks may be made. In addition, an orientation of the wireless position tracking device 100 relative to the head-mounted device 52 may be confirmed according to an orientation of the captured pattern in the head-mounted device 52. Further, a frequency of image capturing performed by the image capturing modules 52A is much lower than a sensing frequency of the motion sensor 130. However, the head-mounted device 52 may include the orientation and posture changes of the wireless position tracking device 100 relative to the head-mounted device 52 according to the motion information provided by the motion sensor 130 and image data captured by the image capturing modules 52A. Therefore, the head-mounted device 52 may calculate a moving distance, a speed, acceleration, a posture change, and three-axis coordinates in space of the wireless position tracking device 100 relative to the head-mounted device 52 based on the two pieces of data. In other words, the head-mounted device 52 may calculate three-axis coordinate values and three-axis angle values of the wireless position tracking device 100 relative to the head-mounted device 52 in space based on the two pieces of data.

FIG. 3 is a schematic cross-sectional view of the wireless position tracking device of FIG. 1 being fixed to a wrist of a user. With reference to FIG. 1 and FIG. 3, the rigid body 110 provided by this embodiment has an inner concave surface 112. The rigid body 110 includes a head 110A, a connecting portion 110B, and a tail 110C. The connecting portion 110B is connected to the head 110A and the tail 110C. In this embodiment, opposite two sides of the connecting portion 110B are individually connected to the head 110A and the tail 110C. Generally, the wireless position tracking device 100 is fixed onto a limb of the user, so the wireless position tracking device 100 having the inner concave surface 112 may better fit the limb of the user. In other words, the inner concave surface 112 may be used to face and contact a fastened item or the limb of the user.

In this embodiment, when the rigid body 110 is fixed to a wrist 20 of a user, the inner concave surface 112 located at the tail 110C abuts against a back surface 22 of the wrist 20, and the inner concave surface 112 at the head 110A abuts against an inner side surface 24 of the wrist 20. Neither an inner surface 26 relative to the back surface 22 of the wrist 20 nor the other side surface relative to the inner side surface 24 of the wrist 20 abuts against the rigid body 110. Therefore, regardless of a thickness of the user's wrist 20, that is, regardless of a length and width of a cross-sectional shape of the user's wrist 20, the rigid body 110 may be stably fixed onto the wrist 20. In this embodiment, the rigid body 110 is substantially L-shaped. In other embodiments, the rigid body 110 may be arcuate, L-shaped, or a notched ring.

In this embodiment, the head 110A has an end surface 112B. At least one of the point light sources 120 is located on the end surface 112B. When the rigid body 110 is fixed to the wrist 20 of the user, the end surface 112B is adjacent to the inner surface 26 of the wrist 20 of the user. It can be seen from FIG. 3 that a cross-sectional area of the head 110A is greater than a cross-sectional area of the tail 110C.

In this embodiment, the wireless position tracking device 100 further includes a coupling member 150 configured for fixing the rigid body 110 to a target. The target herein is the wrist 20, but it may also be an object, and the invention is not limited thereto. The coupling member 150 in this embodiment is a watch belt as an example, but other coupling members may also be used, and the coupling member 150 is coupled by a buckle, an engagement groove, a screw hole, or other means. The coupling member 150 is preferably designed with a variable length, but the invention is not limited thereto. However, the rigid body 110 may also be directly fixed to the user through a glove, an arm cover, a hat, a shoe cover, a leg cover, a wristband, or clothing without the coupling member 150. Similarly, the rigid body 210 may also be fixed to a racket, a bat, a toy gun, or other handheld objects through a structure such as a buckle, an engagement groove, a screw hole, etc., so as to provide position information of this object.

Figure 4A:
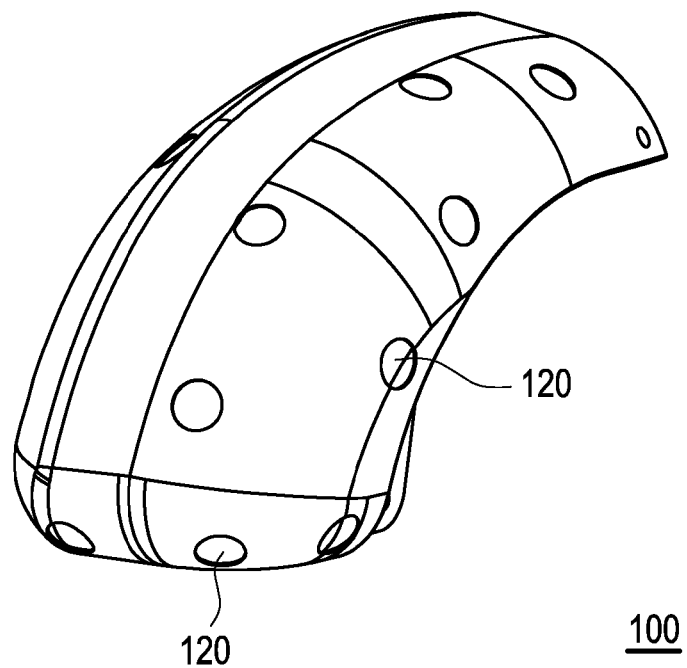
FIG. 4A is a schematic view of the wireless position tracking device of FIG. 1 from another viewing angle.
Figure 4B:
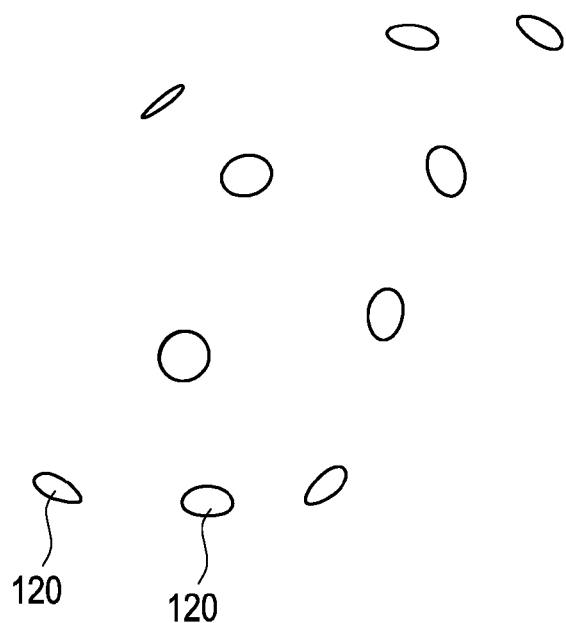
FIG. 4B is a schematic view of remained point light sources which are only visible from this viewing angle in the wireless position tracking device of FIG. 4A.

FIG. 4A is a schematic view of the wireless position tracking device of FIG. 1 from another viewing angle. FIG. 4B is a schematic view of remained point light sources which are only visible from this viewing angle in the wireless position tracking device of FIG. 4A. With reference to FIG. 2, FIG. 4A, and FIG. 4B, it can be seen that when the posture of the wireless position tracking device 100 relative to the head-mounted device 52 changes, the pattern formed by the point light sources 120 captured by the image capturing modules 52A also changes accordingly. By comparing the pre-acquired relative positions among the point light sources 120 with the captured pattern, the head-mounted device 52 may determine the posture of the wireless position tracking device 100 relative to the head-mounted device 52.

Figure 5A:
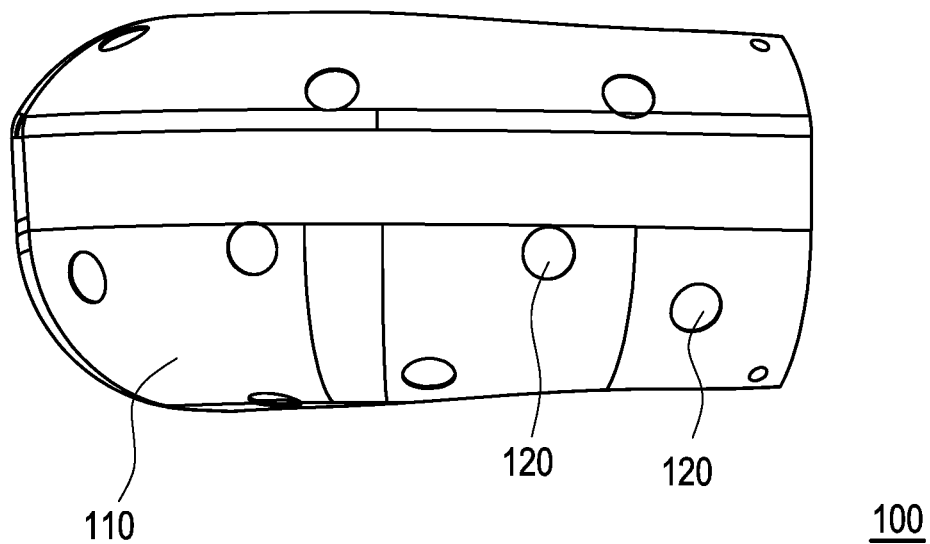
FIG. 5A is a schematic view of the wireless position tracking device of FIG. 1 from still another viewing angle.
Figure 5B:
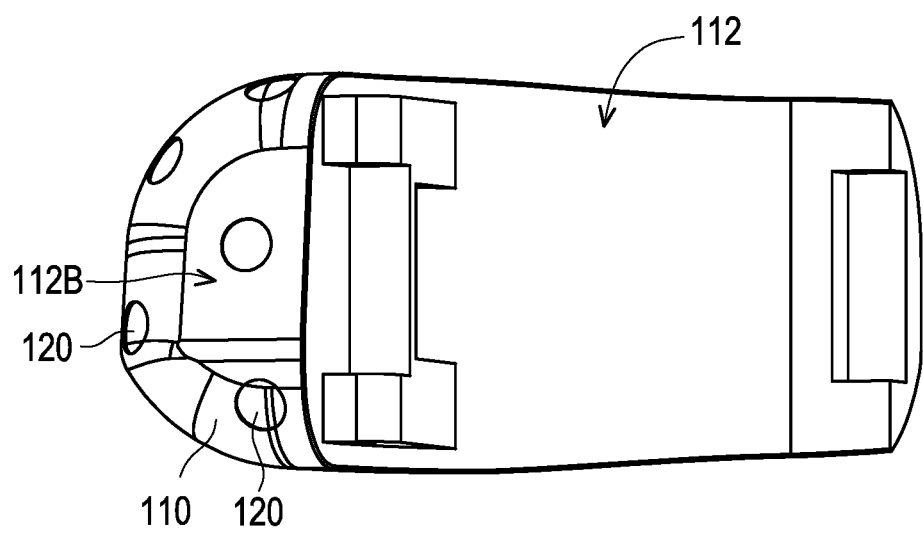
FIG. 5B is a schematic view of the wireless position tracking device of FIG. 1 from yet another viewing angle.

FIG. 5A is a schematic view of the wireless position tracking device of FIG. 1 from still another viewing angle. FIG. 5B is a schematic view of the wireless position tracking device of FIG. 1 from yet another viewing angle. As can be seen from FIG. 5A that the distribution positions of the point light sources 120 on the rigid body 110 may be irregular in this embodiment, and a distribution density may also vary according to tracking requirements. In addition, as can be seen from FIG. 5B that the point light sources 120 in this embodiment are distributed on an outer surface of the rigid body 110 only, and the point light sources 120 are not disposed on the inner concave surface 112.

Figure 6:
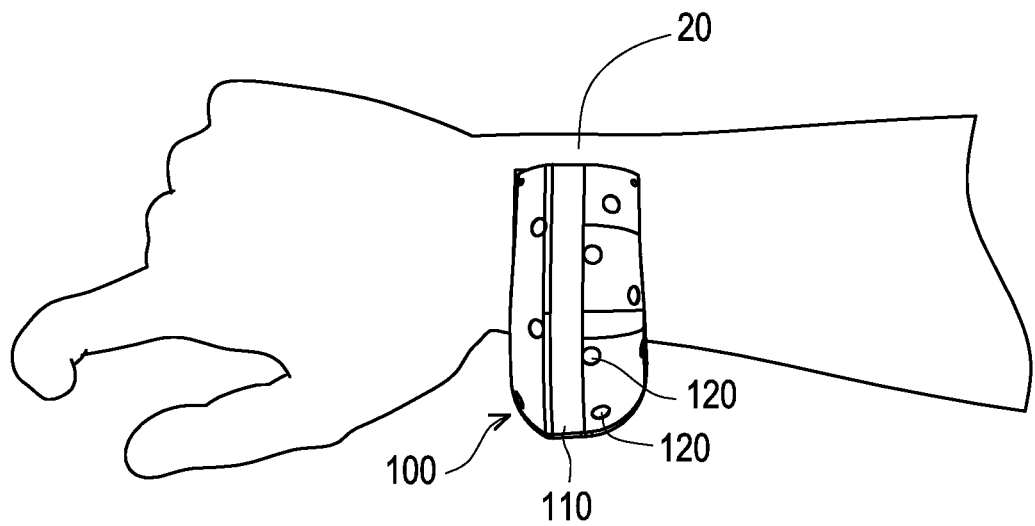
FIG. 6 is a schematic view of the wireless position tracking device of FIG. 1 being fixed to the wrist of the user.

FIG. 6 is a schematic view of the wireless position tracking device of FIG. 1 being fixed to the wrist of the user. An image captured by the image capturing modules 52A must contain at least four point light sources 120 to calculate the position data and posture data (angle) of the wireless position tracking device 100. In short, only four point light sources 120 may form a three-dimensional structure, so as to compare the relative positions of these stored point light sources 120. With reference to FIG. 6, in this embodiment, when the rigid body 110 is fixed to the wrist 20 of the user, an arrangement density of the point light sources 120 located on a side (i.e., right side in FIG. 6) of the rigid body 110 close to an elbow of the user is greater than an arrangement density of the point light sources 120 located on a side (i.e., left side in FIG. 6) of the rigid body 110 close to a palm of the user. When the wireless position tracking device 100 is fixed to the wrist of the user, the image captured by the head-mounted device 52 is usually the side of the rigid body 110 close to the elbow of the user, so more point light sources are required to be distributed on this side, while fewer point light sources 120 are required to be distributed on the other side. In this way, a volume of the wireless position tracking device 100 may be reduced. It should be noted that the light emitted by the point light sources 120 of this embodiment does not carry data. However, in other embodiments, the light emitted by the point light sources 120 has a signal, so the head-mounted device 52 may also recognize codes represented by the point light sources 120.

Figure 7:
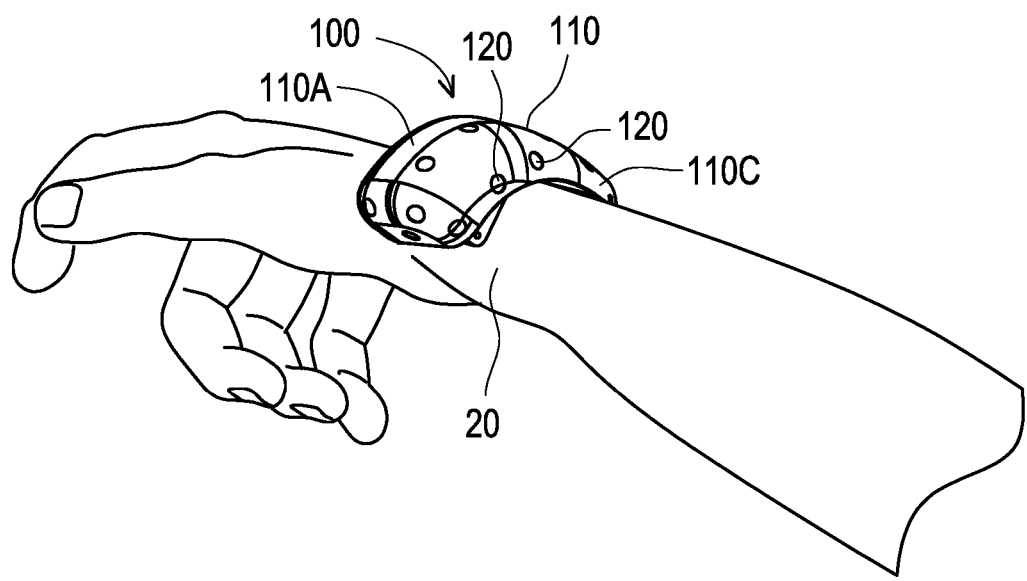
FIG. 7 is a schematic view of the wireless position tracking device of FIG. 1 being fixed to the wrist of the user from another viewing angle.

FIG. 7 is a schematic view of the wireless position tracking device of FIG. 1 being fixed to the wrist of the user from another viewing angle. With reference to FIG. 5A and FIG. 7, in this embodiment, when the rigid body 110 is fixed to the wrist 20 of the user, an arrangement density of the point light sources 120 located on the head 110A of the rigid body 110 close to a side of a thumb of the user is greater than an arrangement density of the point light sources 120 located on the tail 110C of the rigid body 110 close to a side of a little finger of the user. When the wireless position tracking device 100 is fixed to the wrist of the user and the elbow of the user is bent, what the head-mounted device 52 may capture is usually the head 110A on the side of the rigid body 110 close to the thumb of the user, so more point light sources are required to be distributed on this side, while fewer point light sources 120 are required to be distributed on the tail 110C of the other side. To be more specific, when a palm of the user faces the head-mounted device 52, since the head-mounted 52 may only capture the image near the end surface 112B of the head 110A, compared to the tail 110C, more point light sources 120 need to be arranged on the head 110A, so that the head-mounted device 52 may capture an image of a sufficient number of point light sources 120 to locate the posture of the wireless position tracking device 100.

Since an appearance of the rigid body 110 is designed based on ergonomics, the rigid body 110 is not limited to be used in the wireless position tracking device 100 and may also be applied to other wearable devices. The design concept and other applications of the rigid body 110 are described as follows.

Figure 8:
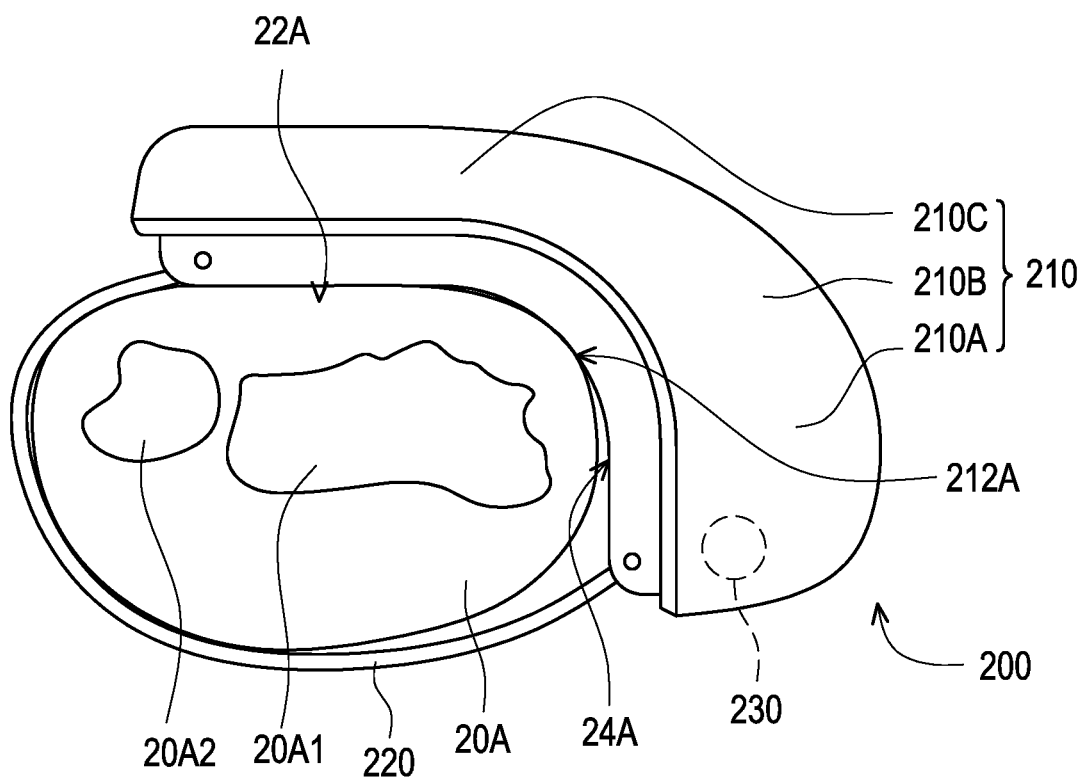
FIG. 8 is a schematic view of a wearable device fixed to a wrist according to an embodiment of the invention.

FIG. 8 is a schematic view of a wearable device fixed to a wrist according to an embodiment of the invention. With reference to FIG. 8, a wearable device 200 of this embodiment is suitable for being fixed to a wrist 20A of a user. For convenience of explanation, the wrist 20A is shown in cross-section in FIG. 8. The wearable device 200 includes a rigid body 210 and a coupling member 220. The rigid body 210 has an inner concave surface 212 and includes a head 210A, a connecting portion 210B, and a tail 210C. The connecting portion 210B is connected to the head 210A and the tail 210C. The inner concave surface 212 at the tail 210C is suitable for abutting against a back surface 22A of the wrist 20A, and the inner concave surface 212 located at the head 210A is suitable for abutting against an inner side surface 24A of the wrist 20A. The coupling member 220 is assembled to the rigid body 210 and is configured for fixing the rigid body 210 onto the wrist 20A.

In the wearable device 200 provided by this embodiment, only the back surface 22A and the inner side surface 24A of the wrist 20A may abut against the inner concave surface 212 of the rigid body 210, while other opposite surfaces of the wrist 20A may not abut against the inner concave surface 212 of the rigid body 210. Therefore, regardless of the size of the wrist 20A, the wearable device 200 may be comfortably fitted to the wrist 20A and thereby exhibits wide applicability.

In this embodiment, the rigid body 210 is substantially L-shaped. When the rigid body 210 is fixed to the user's wrist 20A, the head 210A is adjacent to a radius 20A1 of the wrist 20A, and the tail 210C is adjacent to an ulna 20A2 of the wrist 20A. A shape of an arc surface formed by the radius 20A1 and the ulna 20A2 is generally consistent with a shape of the inner concave surface 212 located at the tail 210C, so the inner concave surface 212 at the tail 210C is adapted to abut against the back surface 22A of the wrist 20A. A shape of an arc surface formed by a side surface of the radius bone 20A1 is generally consistent with a shape of the inner concave surface 212 located at the head 210A, so the inner concave surface 212 at the head 210A is adapted to abut against the inner side surface 24A of the wrist 20A. Since the rigid body 210 abuts against the two discontinuous arc surfaces formed by the back surface 22A and the inner side 24A of the wrist 20A and forms a turning feature, when the wearable device 200 is shaken, the rigid body 210 is less likely to slide. In other words, compared to the related art, even if the coupling member 220 is not tightly tied, the wearable device 200 may still be fixed onto the wrist 20A stably, and this design may be applied to wrists of different sizes.

In this embodiment, the wearable device 200 further includes an electronic module 230 assembled to the rigid body 210. The electronic module 230 includes a point light source, a lens, a light sensor, a vibrator, a speaker, a bioinformation sensor, other electronic modules, or a combination thereof. In other words, the wearable device 200 may provide various functions according to needs and is not limited to the wireless position tracking device 100 mentioned in the foregoing embodiments. In addition, the bioinformation sensor may output electrocardiogram (ECG) data or a photoplethysmography (PPG) signal.

Figure 9A:
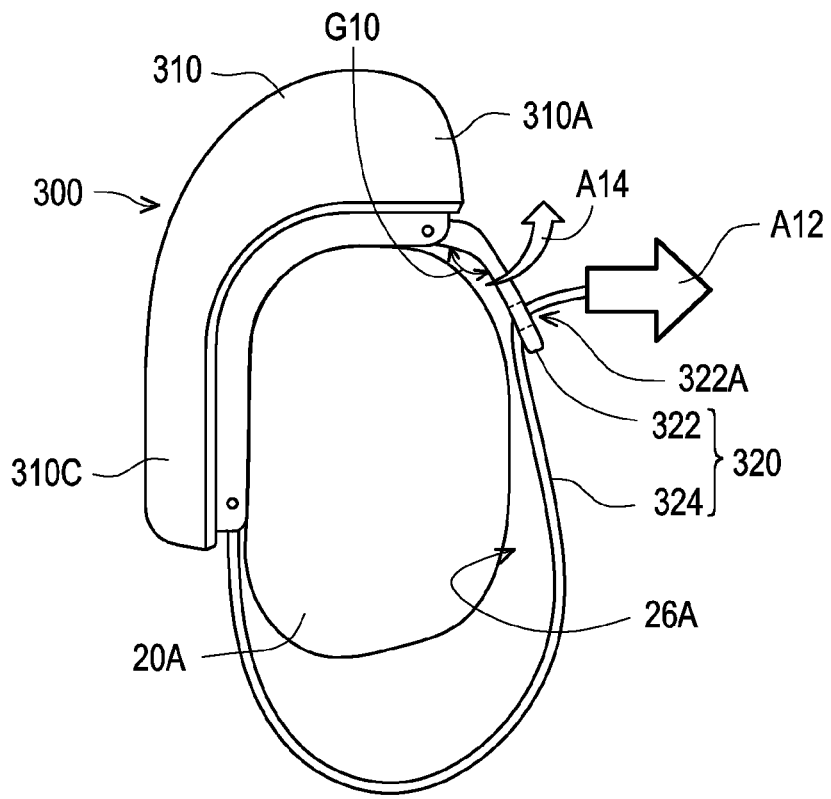
FIG. 9A and FIG. 9B are schematic views of a process of fixing a wearable device to the wrist according to another embodiment of the invention.
Figure 9B:
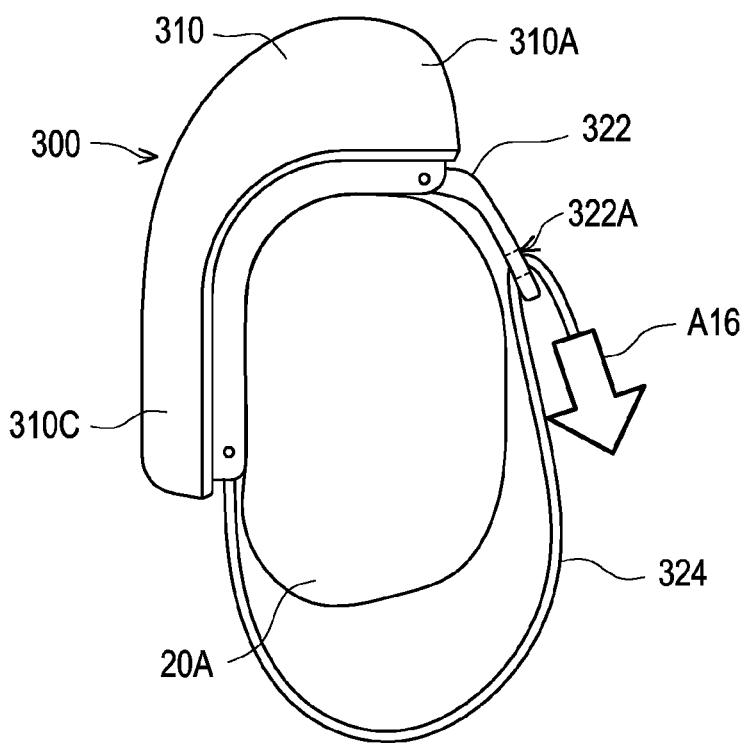

FIG. 9A and FIG. 9B are schematic views of a process of fixing a wearable device to the wrist according to another embodiment of the invention. With reference to FIG. 9A, a wearable device 300 of this embodiment is similar to the wearable device 200 of FIG. 8, except that a coupling member 320 of the wearable device 300 of this embodiment includes an extension member 322 and a belt body 324. One end of the extension member 322 is pivotally connected to a head 310A of a rigid body 310 of the wearing device 300 and extends to an inner surface 26A of the wrist 20A. The other end of the extension member 322 has an opening 322A. The wrist 20A is located between the rigid body 310 and the extension member 322. One end of the belt body 324 is pivotally connected to a tail 310C of the rigid body 310, and the other end of the belt body 324 is adapted to pass through the opening 322A to be fixed onto the belt body 324 that does not pass through the opening 322A.

When the user pulls the other end of the belt body 324 in a direction of an arrow A12 in FIG. 9A, that is, when a direction of a force applied by the user is approximately horizontal, the extension member 322 pivotally connected with the head 310A of the rigid body 310 may rotate in a direction of an arrow A14 to change the direction of the force to be approximately upwards and shorten the remaining belt of the belt body 324 at a lower position. The rigid body 310 is almost unforced and not easily moved. When the user pulls the other end of the belt body 324 in a direction of an arrow A16 in FIG. 9B, that is, when the direction of the force applied by the user is approximately vertically downwards, the extension member 322 transmits the downward force to the rigid body 310 to pull the rigid body 310 towards the wrist 20A, increasing a friction force between the rigid body 310 and the wrist 20A and shortening the remaining belt at the same time, so that the belt body 324 may also be tightened and the rigid body 310 may not be easily moved.

The wearable device 300 provided by this embodiment has a simple structure and provides an ergonomic geometric design. Therefore, when the user fastens the wearing device 300 to the wrist 20A, the user may easily find an appropriate force application angle to pull the other end of the belt body 324 and complete the tightening and fixing of the belt body 324. Further, the rigid body may not be displaced, and the wearable device 300 may be easily fixed onto an ideal tracking position set on the wrist 20A. Moreover, the wrist 20A may be located between the rigid body 310 and the extension member 322 due to the extension member 322. Before the belt body 324 is tightened, the rigid body 310 may also be temporarily supported on the wrist 20A in a balanced manner for one-handed operation. The addition of the rigid extension member 322 may provide better overturning resistance than the tightening performed entirely by the flexible belt body 324.

In this embodiment, the extension member 322 is a bent member. A bending angle G10 of the bent member is greater than or equal to 90 degrees and less than 180 degrees. In this embodiment, the other end of the belt body 324 is adapted to pass through the opening 322A and be fixed onto the belt body 324 that does not pass through the opening 322A through a hook-and-loop fastener, but the invention is not limited thereto. The extension member 322 is a bent member, so that when the user pulls the belt body 324, the user's wrist is less likely to be sandwiched between the extension member 322 and the rigid body 310 to cause pain, that is, the user's wrist is less likely to be pinched.

Figure 10:
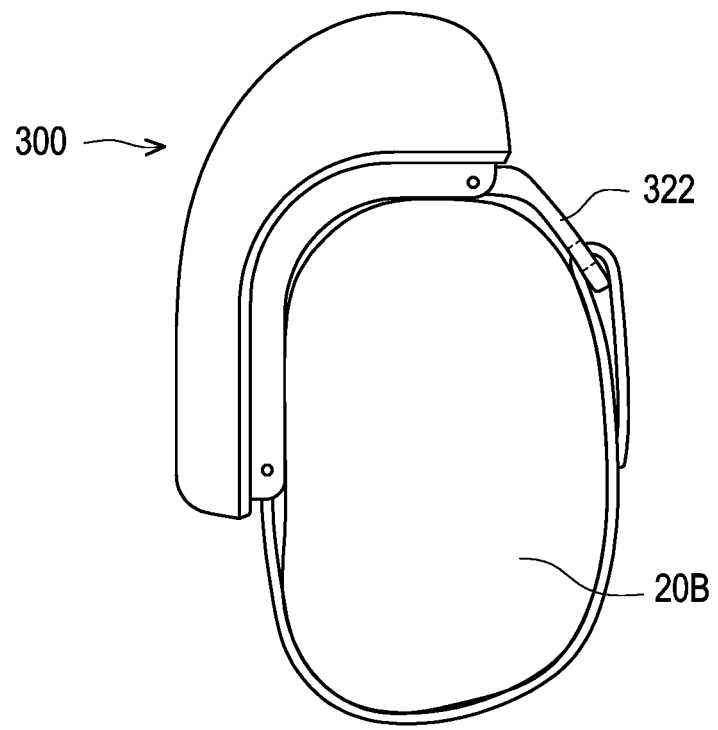
FIG. 10 is a schematic view of the wearable device of FIG. 9A being fixed to another wrist.

FIG. 10 is a schematic view of the wearable device of FIG. 9A being fixed to another wrist. With reference to FIG. 10, in this embodiment, the wearable device 300 is worn on a relatively thick wrist 20B. Because the extension member 322 may rotate, the wearable device 300 may still be worn on the thicker wrist 20B.

In view of the foregoing, in the wireless position tracking device, the display system, and the wearable device provided by the invention, the head-mounted device may determine the posture of the wireless position tracking device according to the change of the pattern formed by the point light sources on the rigid body of the wireless position tracking device. Further, since the appearance of the rigid body is designed to be suitable for being fastened to objects of various sizes, flexible and convenient operation as well as wide applicability are provided. Besides, as long as the wireless position tracking device is fixed to a general object, this object may be transformed into an electronic accessory capable of providing location data, so as to facilitate interaction with the content displayed by the head-mounted device. The development costs of this kind of electronic accessory capable of interacting with the head-mounted device may thereby be lowered. In addition, in the wearable device of this invention, it is convenient for the user to tighten the coupling member with one hand, and the coupling member may not be easily displaced and may also not be easily displaced due to vibration after being fixed. In addition, the device may be worn by the user in an intuitive manner, the coupling member does not need to be tied too tightly to reach the desired location, and the stability in use is ensured.

What is claimed is:

1. A wireless position tracking device, configured for wirelessly communicating with a head-mounted device, the wireless position tracking device comprising:

a rigid body, having an inner concave surface and comprising a head, a connecting portion, and a tail, wherein the connecting portion is connected to the head and the tail;
a plurality of point light sources, fixed to a plurality of positions outside the inner concave surface of the rigid body;
a motion sensor, disposed in the rigid body, configured for sensing a motion of the rigid body and generating motion information; and
a wireless transmission module, disposed in the rigid body and electrically connected to the motion sensor, configured for wirelessly transmitting the motion information to the head-mounted device, wherein the head-mounted device comprises at least one image capturing module, the at least one image capturing module is configured for capturing a pattern formed by the point light sources, and the head-mounted device calculates a position of the wireless position tracking device relative to the head-mounted device according to the motion information, and the head-mounted device calculates a posture/orientation of the wireless position tracking device relative to the head-mounted device according to the pattern.

2. The wireless position tracking device according to claim 1, further comprising a coupling member, assembled to the rigid body and configured for fixing the rigid body to a target.

3. The wireless position tracking device according to claim 1, wherein when the rigid body is fixed to a wrist of a user, the inner concave surface at the tail abuts against a back surface of the wrist, and the inner concave surface at the head abuts against an inner side surface of the wrist.

4. The wireless position tracking device according to claim 1, wherein the head has an end surface, at least one of the point light sources is located on the end surface, and when the rigid body is fixed to a wrist of a user, the end surface is adjacent to an inner surface of the wrist of the user, and a cross-sectional area of the head is greater than a cross-sectional area of the tail.

5. The wireless position tracking device according to claim 1, wherein when the rigid body is fixed to a wrist of a user, an arrangement density of the point light sources located on a side of the rigid body close to an elbow of the user is greater than an arrangement density of the point light sources located on a side of the rigid body close to a palm of the user.

6. The wireless position tracking device according to claim 1, wherein when the rigid body is fixed to a wrist of a user, an arrangement density of the point light sources located on the head close to a side of a thumb of the user is greater than an arrangement density of the point light sources located on the tail close to a side of a little finger of the user.

7. The wireless position tracking device according to claim 1, wherein the rigid body is substantially L-shaped, and when the rigid body is fixed to a wrist of a user, the head is adjacent to a radius of the wrist, and the tail is adjacent to an ulna of the wrist.

8. A display system, comprising:
a head-mounted device, comprising at least one image capturing module; and
a wireless position tracking device, configured for wirelessly communicating with the head-mounted device, the wireless position tracking device comprising:
a rigid body, having an inner concave surface and comprising a head, a connecting portion, and a tail, wherein the connecting portion is connected to the head and the tail;
a plurality of point light sources, fixed to a plurality of positions outside the inner concave surface of the rigid body;
a motion sensor, disposed in the rigid body, configured for sensing a motion of the rigid body and generating motion information; and
a wireless transmission module, disposed in the rigid body and electrically connected to the motion sensor, configured for wirelessly transmitting the motion information to the head-mounted device, wherein the at least one image capturing module is configured for capturing a pattern formed by the point light sources, and the head-mounted device calculates a position of the wireless position tracking device relative to the head-mounted device according to the motion information, and the head-mounted device calculates a posture/orientation of the wireless position tracking device relative to the head-mounted device according to the pattern.

9. The display system according to claim 8, wherein the wireless position tracking device further comprises a coupling member, assembled to the rigid body and configured for fixing the rigid body to a target.

10. The display system according to claim 8, wherein when the rigid body is fixed to a wrist of a user, the inner concave surface at the tail abuts against a back surface of the wrist, and the inner concave surface at the head abuts against an inner side surface of the wrist.

11. The display system according to claim 8, wherein the head has an end surface, at least one of the point light sources is located on the end surface, and when the rigid body is fixed to a wrist of a user, the end surface is adjacent to an inner surface of the wrist of the user, and a cross-sectional area of the head is greater than a cross-sectional area of the tail.

12. The display system according to claim 8, wherein when the rigid body is fixed to a wrist of a user, an arrangement density of the point light sources located on a side of the rigid body close to an elbow of the user is greater than an arrangement density of the point light sources located on a side of the rigid body close to a palm of the user.

13. The display system according to claim 8, wherein when the rigid body is fixed to a wrist of a user, an arrangement density of the point light sources located on the head close to a side of a thumb of the user is greater than an arrangement density of the point light sources located on the tail close to a side of a little finger of the user.

14. The display system according to claim 8, wherein the rigid body is substantially L-shaped, and when the rigid body is fixed to a wrist of a user, the head is adjacent to a radius of the wrist, and the tail is adjacent to an ulna of the wrist.

15. A wearable device, suitable for being fixed to a wrist of a user, the wearing device comprising:
a rigid body, having an inner concave surface and comprising a head, a connecting portion, and a tail; wherein the connecting portion is connected to the head and the tail, the inner concave surface at the tail is suitable for abutting against a back surface of the wrist, and the inner concave surface at the head is suitable for abutting against an inner side surface of the wrist;
a coupling member, assembled to the rigid body and configured for fixing the rigid body onto the wrist, wherein the rigid body is substantially L-shaped, and when the rigid body is fixed to the wrist of the user, the head is adjacent to a radius of the wrist, and the tail is adjacent to an ulna of the wrist; and
an electronic module, assembled to the rigid body.

16. The wearable device according to claim 15, wherein the coupling member comprises:
an extension member, wherein one end of the extension member is pivotally connected to the head and extends to an inner surface of the wrist, and the other end of the extension member has an opening, wherein the wrist is located between the rigid body and the extension member; and a belt body, wherein one end of the belt body is pivotally connected to the tail, and the other end of the belt body is adapted to pass through the opening to be fixed onto the belt body that does not pass through the opening.

17. The wearable device according to claim 16, wherein the extension member is a bent member, and a bending angle of the bent member is greater than or equal to 90 degrees and less than 180 degrees.

18. The wearable device according to claim 16, wherein the other end of the belt body is adapted to pass through the opening and be fixed onto the belt body that does not pass through the opening through a hook-and-loop fastener.

19. The wearable device according to claim 15, wherein the electronic module comprises a point light source, a lens, a light sensor, a vibrator, a speaker, or a bioinformation sensor.

\* \* \* \* \*